US012710171B2

(12) United States Patent
Gerard

(10) Patent No.: US 12,710,171 B2
(45) Date of Patent: Aug. 18, 2026

(54) LED LUMINAIRE THERMAL MANAGEMENT SYSTEM

(71) Applicant: FOHSE INC., Las Vegas, NV (US)

(72) Inventor: Alexander James Gerard, Rogers, MN (US)

( * ) Notice: Subject to any disclaimer, the term of this patent is extended or adjusted under 35 U.S.C. 154(b) by 0 days.

(21) Appl. No.: 19/095,533

(22) Filed: Mar. 31, 2025

(65) Prior Publication Data

US 2025/0224107 A1 Jul. 10, 2025

Related U.S. Application Data

(63) Continuation of application No. 18/457,065, filed on Aug. 28, 2023, now abandoned, which is a continuation of application No. 17/367,427, filed on Jul. 5, 2021, now Pat. No. 11,774,084, which is a continuation of application No. 16/894,614, filed on Jun. 5, 2020, now Pat. No. 11,092,327.

(60) Provisional application No. 62/857,730, filed on Jun. 5, 2019.

(51) Int. Cl.

| | |
|---|---|
| ***F21V 29/61*** | (2015.01) |
| ***F21V 29/503*** | (2015.01) |
| ***F21V 29/51*** | (2015.01) |
| ***F21V 29/67*** | (2015.01) |
| ***F21Y 115/10*** | (2016.01) |
| *F21V 29/71* | (2015.01) |
| *F21V 29/76* | (2015.01) |

(52) U.S. Cl.
CPC ............ *F21V 29/61* (2015.01); *F21V 29/503* (2015.01); *F21V 29/67* (2015.01); *F21V 29/673* (2015.01); *F21V 29/51* (2015.01); *F21V 29/713* (2015.01); *F21V 29/717* (2015.01); *F21V 29/763* (2015.01); *F21Y 2115/10* (2016.08)

(58) Field of Classification Search
CPC ........ F21S 45/49; F21V 29/673; F21V 29/60; F21V 29/61; F21V 29/51; F21Y 115/10
See application file for complete search history.

(56) References Cited

U.S. PATENT DOCUMENTS

2018/0184495 A1* 6/2018 Pelz ...................... B60Q 11/00

* cited by examiner

*Primary Examiner* — William J Carter

(57) ABSTRACT

A thermal management system for led luminaires that, in certain embodiments, includes a heat sink, a heat-dissipating pipe, a base plate, a variable speed air-cooling element, an air-directing structure, a temperature measuring element, and a driver that includes at least one of thermal sensing response logic, light-emitting dimming control logic, fan speed control logic and air-cooling element malfunction detection logic. In some instances, the heat sink includes a plurality of fins coupled to a base plate. In some instances, one or more heat-dissipating pipes extend partially inserted along the length of the base plate and outwardly away from an end of the base plate. In some embodiments, an LED PCB assembly is coupled to the base plate. In some embodiments, fan speed variability, LED dimming, or both are engaged in combination with heat transfer and dissipation associated with the heat sink and the one or more heat-dissipating pipes.

7 Claims, 12 Drawing Sheets

LED LUMINAIRE THERMAL MANAGEMENT SYSTEM

PRIORITY

This application is a continuation of U.S. patent application Ser. No. 18/457,065 entitled "LED LUMINAIRE THERMAL MANAGEMENT SYSTEM" filed Aug. 28, 2023, which claims priority through the applicant's prior non-provisional U.S. patent application Ser. No. 17/367,427 entitled "LED LUMINAIRE THERMAL MANAGEMENT SYSTEM" filed Jul. 5, 2021, which claims priority through the applicant's prior non-provisional U.S. patent application Ser. No. 16/894,614 entitled "LED LUMINAIRE THERMAL MANAGEMENT SYSTEM" filed Jun. 5, 2020, which claims priority through the applicant's prior provisional patent applications entitled: VARIABLE THERMAL MANAGEMENT SYSTEM, application No. 62/857,730, filed Jun. 5, 2019, which provisional application is hereby incorporated by reference in its entirety. This application also incorporates by reference Applicant's prior U.S. non-provisional patent application entitled: METHOD AND APPARATUS FOR IRRADIATION OF PLANTS USING LIGHT-EMITTING ELEMENTS, application Ser. No. 16/805,621, filed Feb. 29, 2020, provided that if any of these prior applications or patents are in any way inconsistent with the present application (including without limitation any limiting aspects), the present application will prevail.

COPYRIGHT

A portion of the disclosure of this patent document contains or may contain material subject to copyright protection. The copyright owner has no objection to the photocopy reproduction of the patent document or the patent disclosure in exactly the form it appears in the Patent and Trademark Office patent file or records, but otherwise reserves all copyright rights.

FIELD OF TECHNOLOGY

The technology of the present application relates generally to thermal management, and more particularly, to thermal management applicable to LED luminaires.

BACKGROUND

Traditional LED horticulture lights utilized large volumes of mid- or low-powered LEDs mounted to passive cooling heat sinks. This typically involved complex and involved installation across large areas, and in the case of greenhouses, often did not function with a high degree of efficacy and reliability. Greenhouse LED systems have typically involved strips of LEDs mounted only to the trusses of buildings, and while they sometimes were able to facilitate sufficient natural light penetration, they did not emit enough light to create significant crop growth. Attempts have been made to reduce the lighting footprint, but due at least in part to issues with thermal and power management, the highest power lights continued to produce lower light output.

One proposed approach to obtaining improved light output from the smaller form factor was to utilize COB (chips on board) style LEDs and fan cool them. This often resulted in one or more of a significant decrease in efficiency due to the COBs having a lower PPF/J rating, an inability to focus the light being emitted from COBs due to their large light emitting surface, or both. This also often had the further disadvantage of an uneven canopy throughout the greenhouse. Further, there were limitations due to the excessive heat generated as a result of large volumes of light sources being closely positioned in small form factor fixtures, combined with the additional heat contributions attributable to electrical components.

Conventional thermal management systems for LED luminaires included the use of a heat sink and a cooling fan, the cooling fan thermally coupled to a light source comprised of a plurality of light-emitting diodes. A thermal sensor sensed the temperature of the luminaire, and in particular the light-emitting diodes, and signaled a controller to operate a cooling fan, based on the temperature of the light source, to maintain the fixture within a desired temperature range.

Traditionally, printed circuit boards were mounted to, for example, a base plate with heat sink fins on top. But this sometimes quickly reached a limit because, at least in part, the forced heat sink fins typically could not transfer heat fast enough to the upper distal portions of the fins for dissipation. With the introduction of additional electrical component to the luminaire, the desire to operate high-wattage light-emitting diodes at higher levels, these traditional heat dissipation techniques sometimes proved inadequate. This often further increased the difficulty in trying to obtain smaller form factor luminaires.

In conventional luminaire heat sinks, fin height is often extended beyond the height where heat would otherwise transfer and dissipate unassisted. As a result, the temperature of various components and the luminaire generally can rise beyond critical threshold temperatures, due, at least in part, to limits on the energy that can travel upwards through the fins, combined with the distance downward into the heat sink fins where the air flow is able to maintain necessary velocity. As a result, certain high-power operation conditions and reduced form factor configurations could not be achieved due, at least in part, to the inability to dissipate enough heat to maintain proper system operating temperatures.

With the heat now distributed throughout the heat sink fins in a way that it can be extracted, forced air flow can be applied via one or more forced air cooling elements, such as two variable speed fans mounted within a fan shroud, each fan shroud directing air flow as desired, such as evenly, throughout the heat sink. This flow can remove the energy from the heat sink fins, allowing the system, at least in part, to maintain a proper operating temperature.

SUMMARY

The applicants believe that they have discovered at least one or more of the problems and issues with the systems noted above as well as advantages variously provided by differing embodiments of the LED luminaire thermal management system.

The LED luminaire thermal management system, at least in part, allows the luminaire to maintain proper operating temperatures for one or more temperature sensitive electrical components, which can extend the life of such components, improve the operational efficiency and efficacy of the such components, or both. In some instances, this approach to thermal management also reduces electrical consumption. The variable thermal management apparatus includes one or more of a heat sink, such as a finned heat sink, heat dissipating pipes, such as copper pipes with, in some instances, tin plating, a forced air cooling element such as a cooling fan, an air-directing structure such as a fan shroud, a base plate, such as an aluminum base plate, a temperature measuring element, such as a board-level thermistor, and a controller such as a programmable driver.

In some embodiments, a high-power LED PCB grid assembly is mounted heat sink assembly, supporting the generation of high light output from a form factor smaller than traditional luminaires. Resulting benefits can include one or more of reduced light blockage, an increased amount of light that can be sublimated in the absence of natural light, simplified installation, and increased room for ventilation at the ceiling area.

In some instances, the use of the LED luminaire thermal management system obtains a smaller luminaire assembly form factor, helping to increase the amount of natural sunlight that would otherwise have been blocked by larger luminaires. Where traditional small greenhouse luminaires focused primarily on lengthening the daylight hours with the minimum amount of light required to keep a plant out of flower, a luminaire using this thermal management approach can allow the luminaire to produce enough light so that the plants can continue to grow at the same rate as they would in, for example, an indoor cultivation center due in part to achieving higher output levels. Further, the small form factor is appropriate for use in high bay areas where HVAC equipment typically takes up space that would normally be required for lighting systems.

Combining one or more variable speed air-cooling elements, such as fans, with one or more of the heat sink assembly, heat-dissipation pipes, air-directing structures, and light-emitting dimming can reduce the form factor of the luminaire to a fraction of that typically found with traditional luminaires. In some instances, a one square foot apparatus can emit the same amount of light that would traditionally have required six square feet of passive cooling to maintain an operating temperature within the LED specifications.

In some embodiments, the LED luminaire thermal management system includes one or more temperature measurement components, such as, for example, a thermistor, thermocouple, or the like. The temperature measuring elements can be positioned at a location representative of the temperature environment for the components of interest, such as, for example, at the center of a printed circuit board. Cooling element speed variation can be linear with respect to temperature as indicated by, for example, the change in electrical resistance of the thermistor. As the temperature increases, the fan speed can increase until the temperature begins to decrease. As the temperature decreases, the fan speed can decrease, until a desired temperature is obtained.

In some embodiments, light-emitting elements have a max operating temperature of around 100° C., such as at the core thermal pin within a light emitting diode. In certain instances, targeting a temperature lower than the max operating temperature, such as, for example, 60° C. can result in higher efficacies such as a higher ratio of photosynthetic photon flux generated by the light-emitting element to electrical input.

In some embodiments, one or more heat sink portions are constructed using a heat-dissipating material, such as, for example, 6063 aluminum. In some instances, the material is treated to increase the thermal dissipation properties by, for example, increasing surface area, such as by sulfur anodization. In some embodiments, the LED PCB includes a metal core board that can increase the thermal transfer from the LEDs to a thermal pad. Thermal pads, such as the Aavid Thermalloy thermal pads, can eliminate the air proximal to the distal surface of the PCB, increasing the heat transfer to the heat sink, or both.

In some embodiments, temperatures are measured via temperature measuring elements, such as thermistors, located proximal to temperature sensitive elements, such as centrally located on the LED PCBs, delivering temperature indications, such as by changes in resistance, to the controller, such as a programmable driver, to increase or decrease the air-cooling element speed, such as the fan speed, accordingly. The controller decreases the fan speed as the ambient environment temperature trends downwards towards the desired pre-defined operational temperature and increases the fan speed as the temperature tends upward and away from the desired pre-defined operational temperature. For example, in some instances when used in a greenhouse mounted high in the trusses of the structure, the solar heating effect of the greenhouse can lead to temperatures above 150° F., creating an inhospitable place to operate LED lighting systems. During such a condition, the fans may run at full speed in order to maintain proper operating temperatures. In controlled environments, by contrast, where temperatures are regulated to stay below 80° F. the fans may operate at significantly lower speeds, conserving electrical consumption, reducing noise, or both. Further, by maintaining a lower light-emitting diode operating temperature, the additional electrical savings can be achieved due to the light-emitting diodes having a higher efficacy at lower temperatures. In some instances, the electrical savings attributable to the lower operating temperatures of the light-emitting diodes is greater than the electrical savings attributable to the reduced fan speed.

In some embodiments, an air-cooling element malfunction indication message is generated when one or more fans have operational interruptions, such as, for example, when the fan fails to rotate. This air-cooling element malfunction indication message can initiate a safety protocol via the light-emitting dimming control logic of the programmable driver that will continue to control temperature through power reduction, such as by diming one or more of the light-emitting elements, which can reduce the likelihood that such light-emitting elements will suffer damage or otherwise generate excessive heat that could damage other electrical components. In certain multiple fan implementations, the safety protocol may first rely on the air-cooling element speed control logic of the programmable driver to vary the speeds of one or more of the remaining fans as the primary method of continuing to control temperature, engaging power reduction in the circumstances where some or all light-emitting elements are exhibiting heat characteristics exceeding a pre-defined threshold. In other implementations, a combination of power reduction and remaining operating fan speed variation is initiated when the air-cooling element malfunction indication is detected.

In some embodiments, the programmable driver component contains an independent thermal management system that may be enhanced by locating the intake portion of one or more variable speed air-cooling elements proximal to the programmable driver, drawing air flow across one or more programmable driver surfaces.

In some embodiments, the heat-dissipating pipes can be extended outwardly away from the end of the base plate, reverse direction, and extend further towards and into the upper distal portion of the heat sink fins. In some implementations, the heat-dissipating pipes are soldered to the fins. This coupling to the upper distal portion of the heat sink fins can increase the thermal transfer by distributing the heat to the upper portion of the fins, with forced air cooling the upper portion.

In some embodiments, one or more heat-dissipating pipes extend along a line defined by a row of LEDs. In some implementations, the heat-dissipating pipes are constructed primarily of copper and plated with tin. The tin plating on the copper can serve to improve the soldering of the heat-dissipating pipe to the fins.

In some embodiments, individual heat-dissipating pipes are aligned with each row of LEDs, which can improve heat dissipation, such as heat dissipation greater than that which would otherwise be possible using a standard backplate on a heat sink, such as an aluminum plate. This can help to facilitate heat transfer from the extremely high thermal load that can exist at the core pin of an LED, and particularly in a small form-factor luminaire.

In some embodiments, the heat-dissipating pipes are positioned such that they transfer heat from the heat sink back plate to the upper distal portion of the heat sink fins. In some instances, heat-dissipating pipes can be coupled to, or partially inserted into at least a portion of, the base plate of the heat sink to increase the surface area for purposes of heat transfer. The heat-dissipating pipes can be constructed of various heat conductive materials, such as, for example, copper. Thermal efficiencies of copper can allow the small heated areas of an LED chip, for example, 32 watts of energy within a 2.83×5.91 mm area on a chip, to more quickly transfer and dissipate across the copper pipe and then transfer into the aluminum base plate from the heat-dissipating pipe.

In some implementations, the heat sink fin height is extended beyond the height where heat would otherwise transfer and dissipate unassisted. With the inclusion of a heat-dissipating pipe mechanism, the heat sink base plate temperature can be maintained below critical threshold temperatures, due, at least in part, to the heat-dissipating pipe contributing to transferring energy such that the heat travels upwards through the fins. As the heat-dissipation pipes can transfer heat to the upper distal portions of the heat fins, certain high-power operation can be achieved due, at least in part, to the ability to dissipate enough heat to maintain proper system operating temperatures.

With the heat now distributed throughout the heat sink fins in a way that it can be extracted, forced air flow can be applied via one or more variable speed air-cooling elements, such as two variable speed fans mounted within a fan shroud, each fan shroud directing air flow as desired, such as evenly, throughout the heat sink, at the upper distal portion of the fins, or both. This flow can remove the energy from the heat sink fins, allowing the system, at least in part, to maintain a proper operating temperature, due at least in part to the directed air flow maintaining increased velocity along the length of the fins, facilitating heat dissipation of the heat transferred to the upper distal portion of the fins by the heat-dissipation pipes, or both.

In some instances, one or more grids of 7 mm×7 mm LEDs, such as, for example, grids of 36 high-powered white LEDs, are coupled to one or more PCB plates, such as a PCB plate measuring approximately 7 in×7 in. Coupling the heat-dissipating pipes with a finned heat sink can improve thermal performance and, in some cases combined with a variable speed forced air cooling, can increase power applied to the LEDs without overheating them and while increasing efficacy.

The heat-dissipating pipes can rapidly transfer the heat from the light-emitting diodes to an upper distal portion of the heat fins. A temperature measuring element, such as a thermistor or a thermocouple can detect the operating temperature and provide temperature indication to the programmable driver that can modify the speed of one or more variable speed air-cooling elements, such as cooling fans, in response to temperature variations and targets. The air flow across the surface of the heat sink fins can, in part, further help to dissipate the heat.

The foregoing description, for purpose of explanation, has been described with reference to specific embodiments. However, the illustrative discussions above are not intended to be exhaustive or to limit the disclosed system to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification are to be construed as meaning "at least one of." In addition, for ease of use, the words "including" and "having," as used in the specification, are interchangeable with and have the same meaning as the word "comprising." In addition, the term "based on" as used in the specification is to be construed as meaning "based at least upon."

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
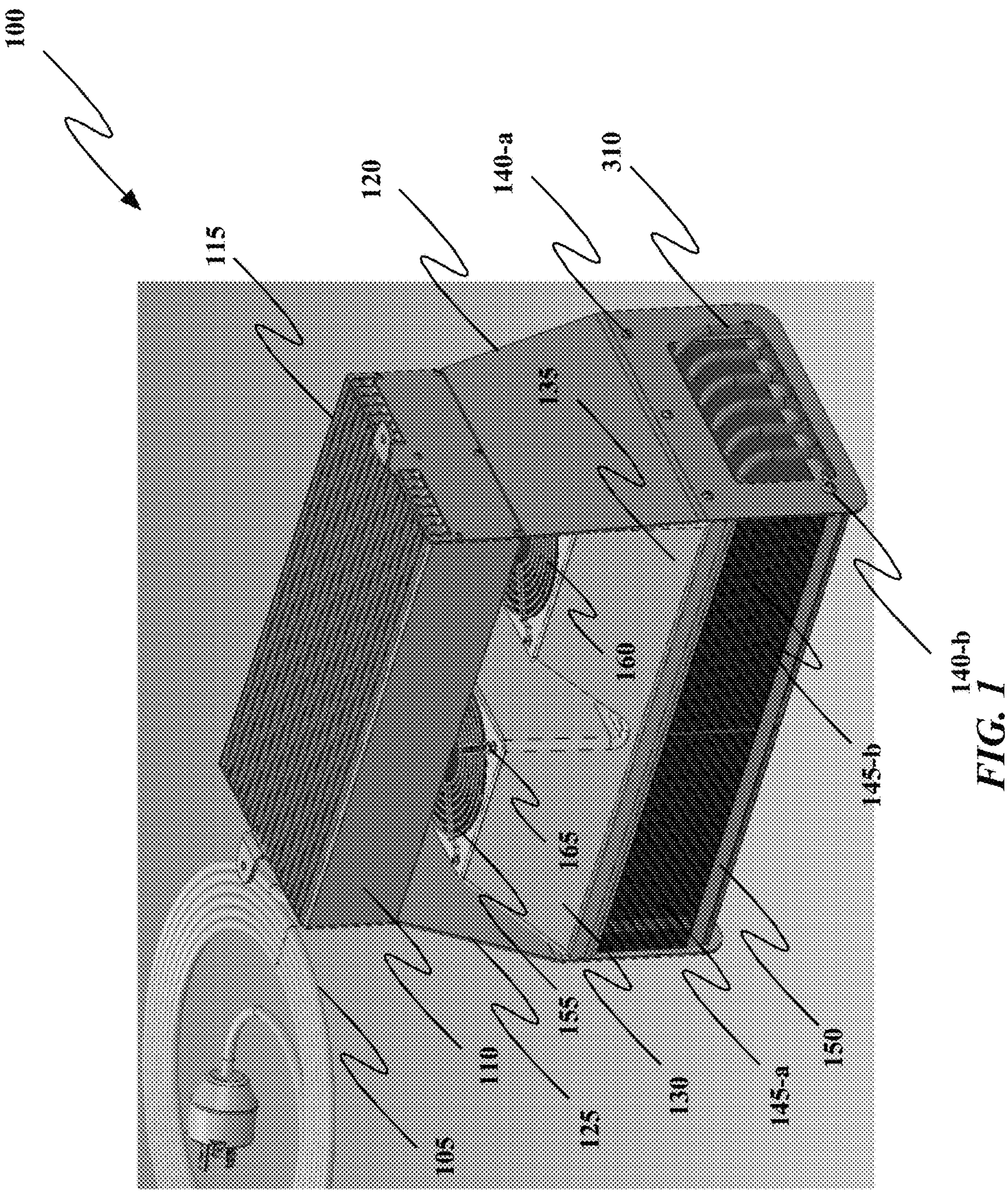
FIG. 1 is a top perspective view of an LED luminaire assembly with a thermal management system.

It will be understood that implementations are not limited to the specific components disclosed herein, as virtually any components consistent with the intended operation of a luminaire thermal management system may be utilized. Accordingly, for example, although particular fans, heat sinks, fan shrouds, heat-dissipating pipes, light-emitting diodes, drivers, thermistors, and the like may be disclosed, such components may comprise any shape, size, style, type, model, version, class, grade, measurement, concentration, material, weight, quantity, and/or the like consistent with the intended operation of a method and/or system implementation for an LED luminaire thermal management system may be used.

In places where the description above refers to particular implementations of an LED luminaire thermal management system, it should be readily apparent that a number of modifications may be made without departing from the spirit thereof and that these implementations may be applied to other luminaire thermal management systems or assemblies. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

SPECIFICATION

The applicant believes that it has discovered at least one or more of the problems and issues with systems and methods noted above as well as advantages variously provided by differing embodiments of the LED luminaire thermal management system disclosed in this specification.

Briefly and in general terms, the present disclosure provides for improved thermal management, reduced electrical consumption, or both, and more particularly, to improved thermal management of luminaires for enhancing plant growth, increasing efficacy, or both.

The term "light-emitting element" is used to define an apparatus that emits radiation in a region or combination of regions of the electromagnetic spectrum for example, the visible region, infrared and/or ultraviolet region, when activated by applying a potential difference across it or passing a current through it, for example. Therefore, a light-emitting element can have monochromatic, quasi-monochromatic, polychromatic or broadband spectral emission characteristics. Examples of light-emitting elements include semiconductor, organic, or polymer/polymeric light-emitting diodes, optically pumped phosphor coated light-emitting diodes, optically pumped nano-crystal light-emitting diodes or other similar devices as would be readily understood by a person having ordinary skill in the art. Furthermore, the term light-emitting element is used to define the specific device that emits the radiation, for example an LED die, and can equally be used to define a combination of the specific device that emits the radiation together with a housing or package within which the specific device or devices are placed.

The term "luminaire" is generally used to define a light source, lighting unit and/or light fixture, primarily used in illumination application, comprising one or more light-emitting elements together with a combination of parts designed to support, position, and/or provide power to the one or more light-emitting elements. Other such parts, which may include but are not limited to various optical elements for collecting, mixing, collimating, diffusing, focusing, and/or orienting light output from the one or more light-emitting elements, optionally in conjunction with various electrical and/or mechanical adjustment mechanism, may also be comprised in a given luminaire, as should be readily apparent to a person having ordinary skill in the art. Furthermore, the term "luminaire" is generally used to define a light source, lighting unit and/or light fixture that may be portable and/or mountable to a wall, ceiling, furniture (e.g., bookcase, shelving unit, display case, cabinet, etc.) and/or other such support structure.

As used herein, the term "about" and "approximately" refers to a ¬±10% variation from the nominal value. It is to be understood that such a variation is always included in any given value provided herein, whether or not it is specifically referred to.

Unless defined otherwise, all technical and scientific terms used herein have the same meaning as commonly understood by one of ordinary skill in the art to which this disclosed system belongs.

Briefly and in general terms, the present disclosure provides for improved thermal management, reduced electrical consumption, or both, and more particularly, to improved thermal management of luminaires for enhancing plant growth, increasing efficacy, or both.

The term "light-emitting element" is used to define an apparatus that emits radiation in a region or combination of regions of the electromagnetic spectrum for example, the visible region, infrared and/or ultraviolet region, when activated by applying a potential difference across it or passing a current through it, for example. Therefore, a light-emitting element can have monochromatic, quasi-monochromatic, polychromatic or broadband spectral emission characteristics. Examples of light-emitting elements include semiconductor, organic, or polymer/polymeric light-emitting diodes, optically pumped phosphor coated light-emitting diodes, optically pumped nano-crystal light-emitting diodes or other similar devices as would be readily understood by a person having ordinary skill in the art. Furthermore, the term light-emitting element is used to define the specific device that emits the radiation, for example an LED die, and can equally be used to define a combination of the specific device that emits the radiation together with a housing or package within which the specific device or devices are placed.

The term "luminaire" is generally used to define a light source, lighting unit and/or light fixture, primarily used in illumination application, comprising one or more light-emitting elements together with a combination of parts designed to support, position, and/or provide power to the one or more light-emitting elements. Other such parts, which may include but are not limited to various optical elements for collecting, mixing, collimating, diffusing, focusing, and/or orienting light output from the one or more light-emitting elements, optionally in conjunction with various electrical and/or mechanical adjustment mechanism, may also be comprised in a given luminaire, as should be readily apparent to a person having ordinary skill in the art. Furthermore, the term "luminaire" is generally used to define a light source, lighting unit and/or light fixture that may be portable and/or mountable to a wall, ceiling, furniture (e.g., bookcase, shelving unit, display case, cabinet, etc.) and/or other such support structure.

As used herein, the term "about" and "approximately" refers to a ¬±10% variation from the nominal value. It is to be understood that such a variation is always included in any given value provided herein, whether or not it is specifically referred to.

Unless defined otherwise, all technical and scientific terms used herein have the same meaning as commonly understood by one of ordinary skill in the art to which this disclosed system belongs.

Referring first to FIG. 1, this shows a top perspective view of an LED luminaire assembly with a thermal management system 100. A power cord 105 is electrically connected to a programmable driver 110 with an optional independent thermal management system 115. The programmable power driver 110 can be a single driver or multiple drivers, and can be of a variety of wattages, including, for example, higher wattages such as 1200 watts. In some embodiments, the programmable driver 110 is mounted to one or more luminaire housing portions, such as a side plate 120, 125. In this example, the programmable driver heat sink 115 is positioned distal to the LED luminaire center operable to dissipate heat outwardly away from the LED luminaire 100.

In some instances, an air-directing structure, such as a fan shroud 130, 135, is positioned between a bottom surface portion of the programmable driver 110 and the upper distal portion of the heat sink fins, mounted to a side plate 120, 125 using at least one side plate mounting screw 140-*a*. In certain implementations, an intake guard, such as a fan guard 155, 160, is mounted to the fan 705, 710 using one or more fan mounting screws 165. In some instances, a heat sink assembly 145, including a base plate 150 proximal to an LED PCB (e.g., see FIG. 5 at 505) is mounted to a side plate 120, 125 using at least one side plate mounting screw 140-*b*, positioned below the fan shroud 130, 135 to receive airflow generated by the by the variable-speed cooling element (e.g., see FIG. 7 at 705, 710).

Figure 2:
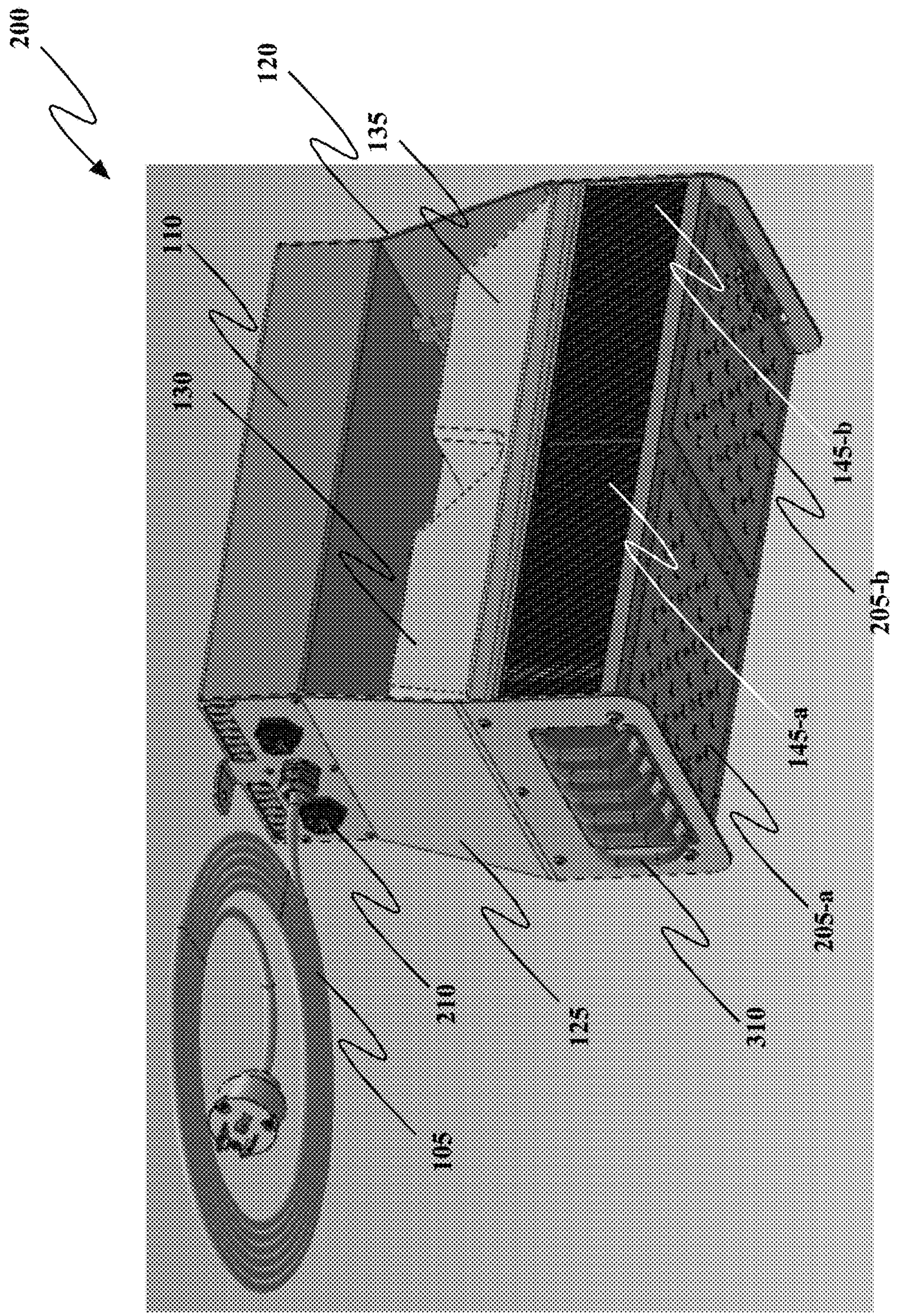
FIG. 2 is a bottom perspective view of the LED luminaire assembly with a thermal management system of FIG. 1.

Referring now to FIG. 2, in some embodiments, an optical element 205, such as, for example, a PMMA focal lens, is mounted to the LED PCB (e.g., see FIG. 5 at 505) adjacent to the light-emitting diodes 515. In some instances, an RJ45 coupler 210 is positioned on one or more side plates 120, 125

Figure 3:
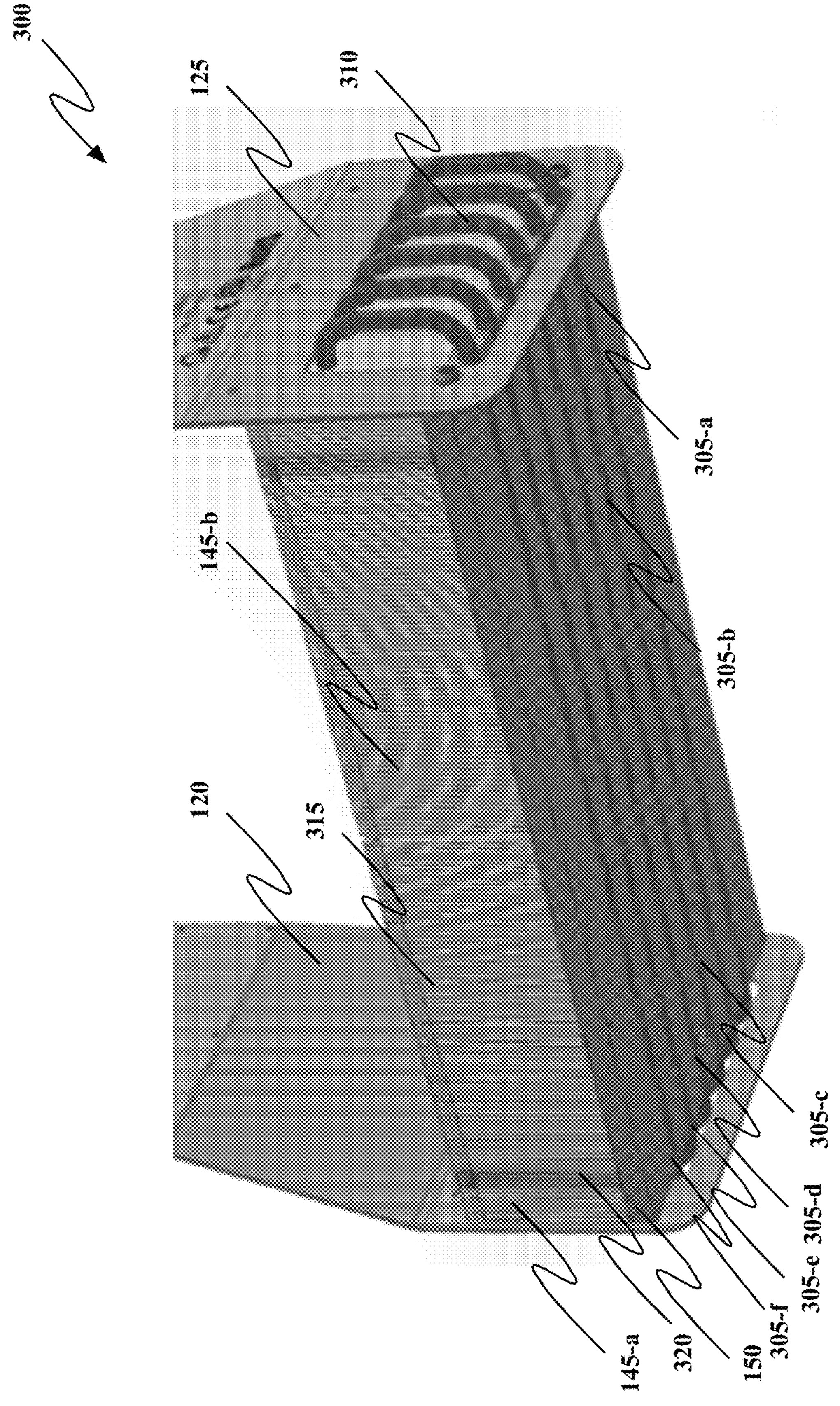
FIG. 3 is bottom perspective view of a heat sink assembly of the LED luminaire assembly with a thermal management system of FIG. 1 and FIG. 2.
Figure 4:
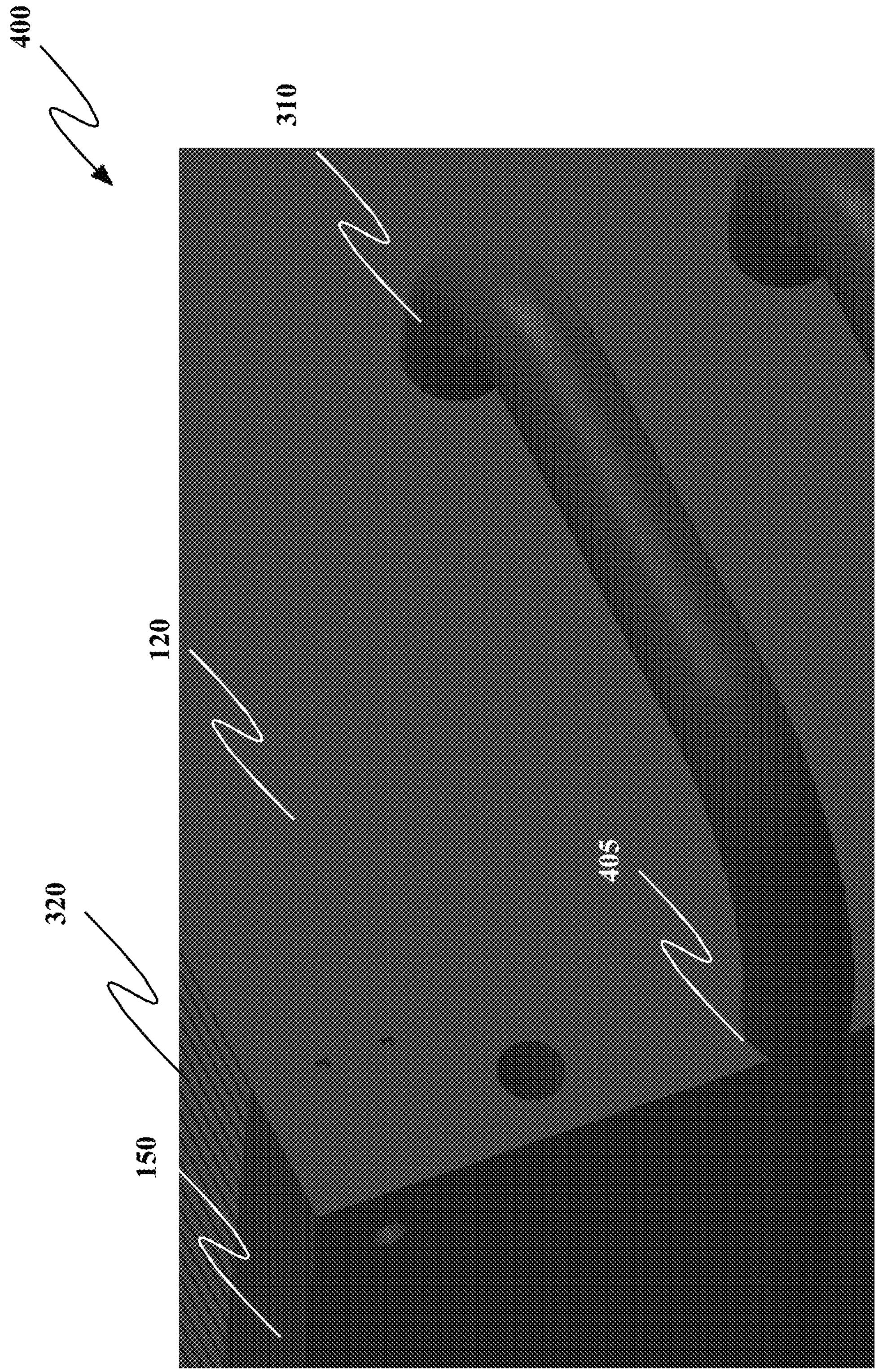
FIG. 4 is a side perspective view of the outwardly extending heat-dissipating pipes of the heat sink assembly of FIG. 3.
Figure 12:
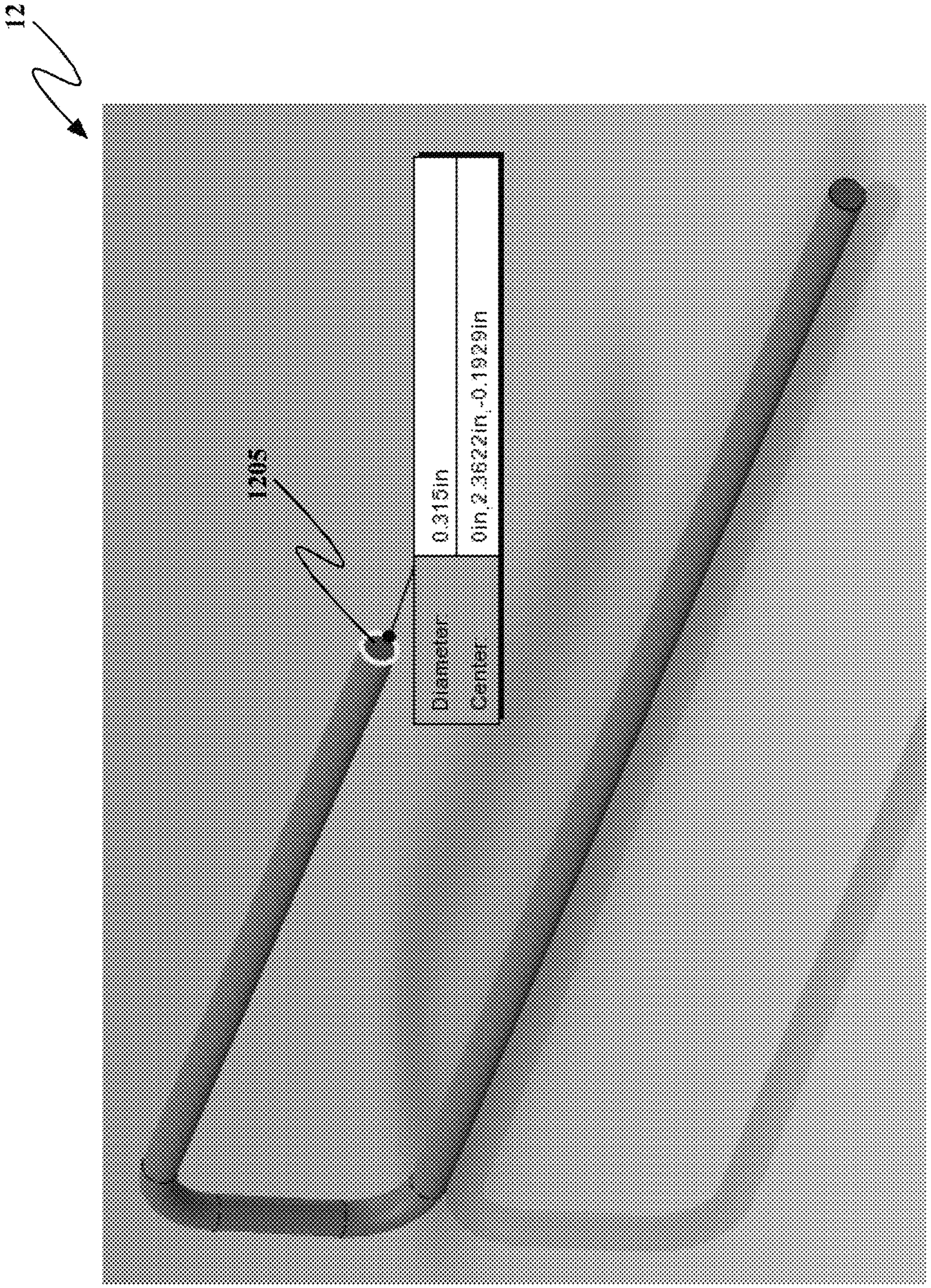
FIG. 12 is a perspective view of a heat-dissipating pipe.

Referring now to FIG. 3 and FIG. 4, in some embodiments, one or more heat-dissipating pipes 305 extends along the full length of the base plate 150. In some implementations, the heat-dissipating pipes 305, 310 are constructed primarily of copper and plated with tin. In some instances, a portion of the heat-dissipating pipes 310 initially extends outwardly away from the side edge of the base plate, then curves upward and back towards, and extends through, the upper distal portion of at least a portion of the heat sink fins 315. In some embodiments, a fossa, notch, groove, or cutout 405 provides a channel, depression, or slot in which the base plate extending portion of the heat-dissipating pipe 305 is inserted or partially inserted, abutting the base plate 150, a portion of the lower proximal portion of the heat sink fins 320, or both. In some instances, the base plate extending portion of the heat-dissipating pipe 305 and associated fossa, notch, groove, or cutout 405 are aligned in parallel to a line running through the center of a row of light-emitting diodes (e.g., see FIG. 5 at 515). In some instances, all or most of the light emitting diodes 515 are included in these aligned rows. In some instances, the diameter of the heat dissipating pipes is between 0.2 inches and 0.4 inches. In certain instances, the diameter of the heat dissipating pipes is approximately 0.31 inches (e.g., see FIG. 12 at 1205).

Figure 5:
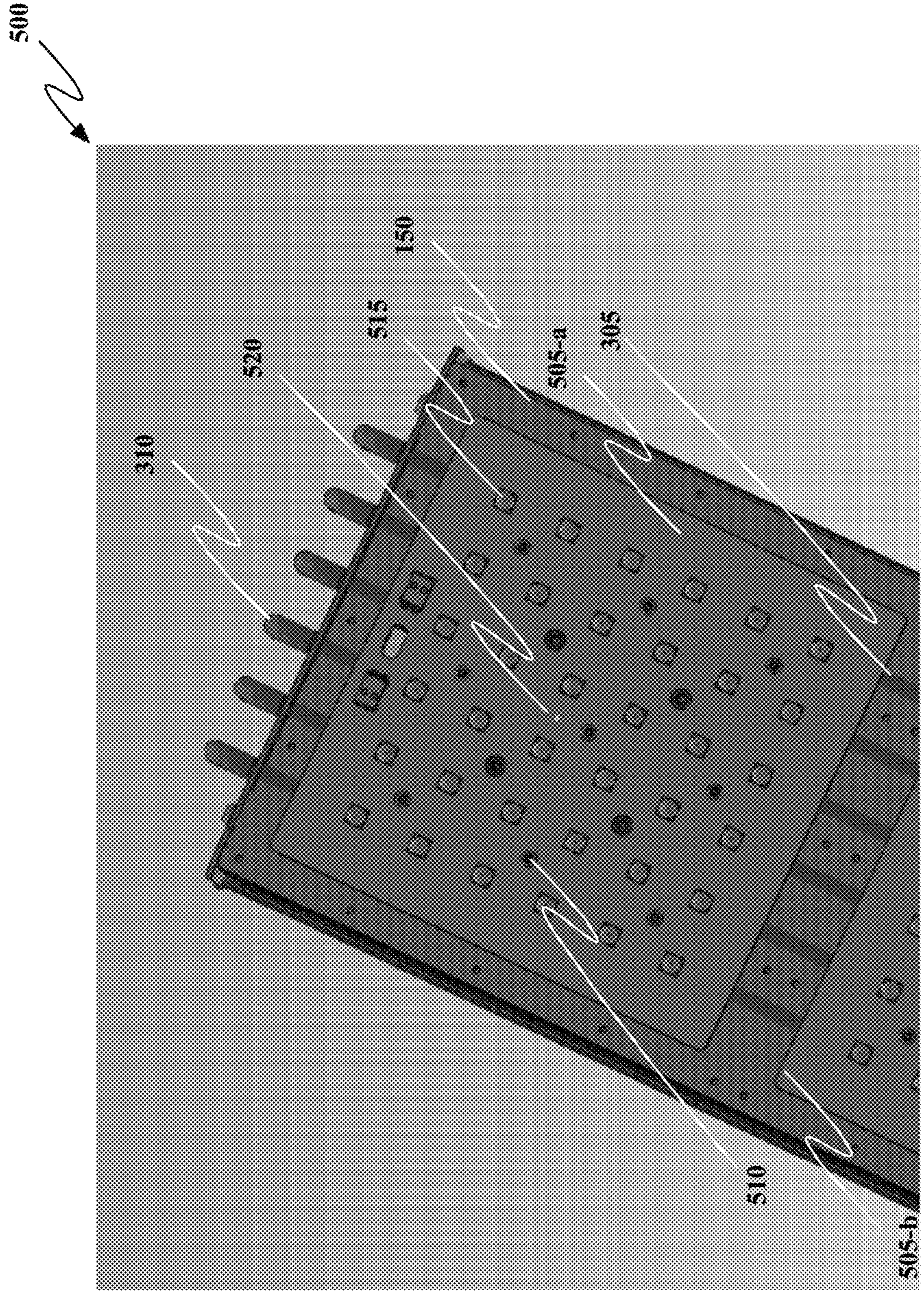
FIG. 5 is bottom view of an LED PCB with a centrally-located thermistor of the LED luminaire assembly of FIG. 1.

Referring now to FIG. 5, in some implementations, one or more temperature measuring elements, such as a board-level thermistor 520 is disposed within, or nested in, the one or more electrical components, such as the LED PCB 505. In this instance, the thermistor 520 is located at or near the center of the LED PCB 505. In some instances, the temperature measuring elements 520 is negative temperature coefficient thermistor. The thermistor 520 is thermally coupled to the LED PCB 505 and is sensitive to the temperature of the heat sink LED PCB 505. As the temperature of the LED PCB 505 increases, the resistance of the thermistor 520 decreases. As the temperature of the LED PCB 505 decreases, the resistance of the thermistor 520 increases. Accordingly, the flow of current to the motor of the variable-speed air cooling element 705 is varied according to the air-cooling element speed control logic of the programmable driver (e.g., see FIG. 1 at 110) and is therefore a function of the temperature of the LED PCB 505.

In some embodiments, a high-power LED PCB grid assembly is mounted to the base plate 150 of the heat sink assembly In some instances, one or more grids of 7 mm×7 mm light-emitting diodes 515, such as, for example, grids of 36 high-powered white light-emitting diodes, are coupled to one or more LED PCB plates 505, such as an LED PCB plate measuring, for example, approximately 7 in×7 in. It will be appreciated by those skilled in the art that the grid size, the number of light-emitting diodes, the spacing of the light-emitting diodes, and the like may be varied up to the operational limits allowed by the degree of heat dissipation.

The LED PCB grid assembly can further include a metal core for purposes of thermal conductivity, a thermal pad to reduce or eliminate the air behind the LED PCB, or both.

Figure 6:
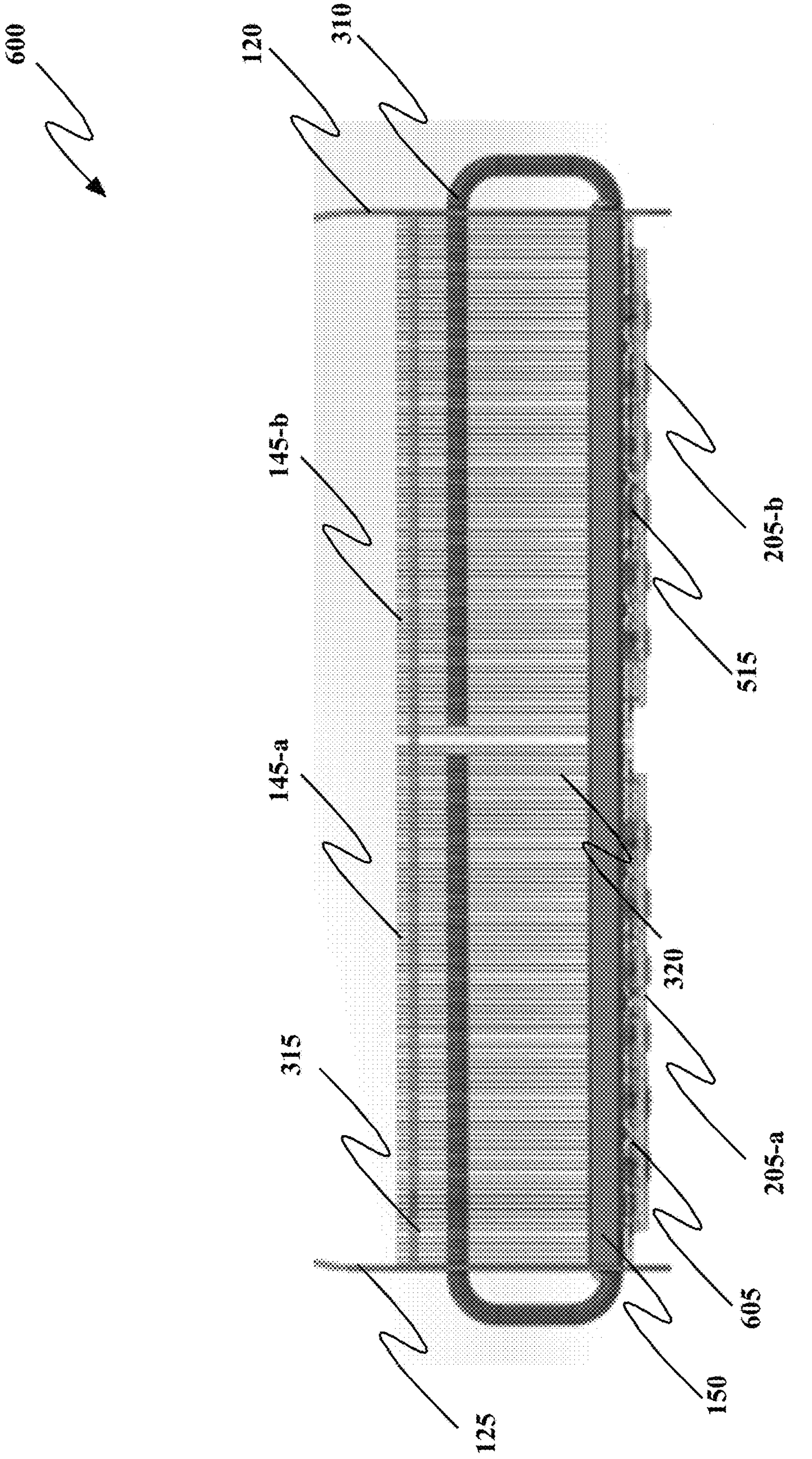
FIG. 6 is a front view of the LED PCB and optical element mounted to the heat sink assembly of FIG. 3.
Figure 11:
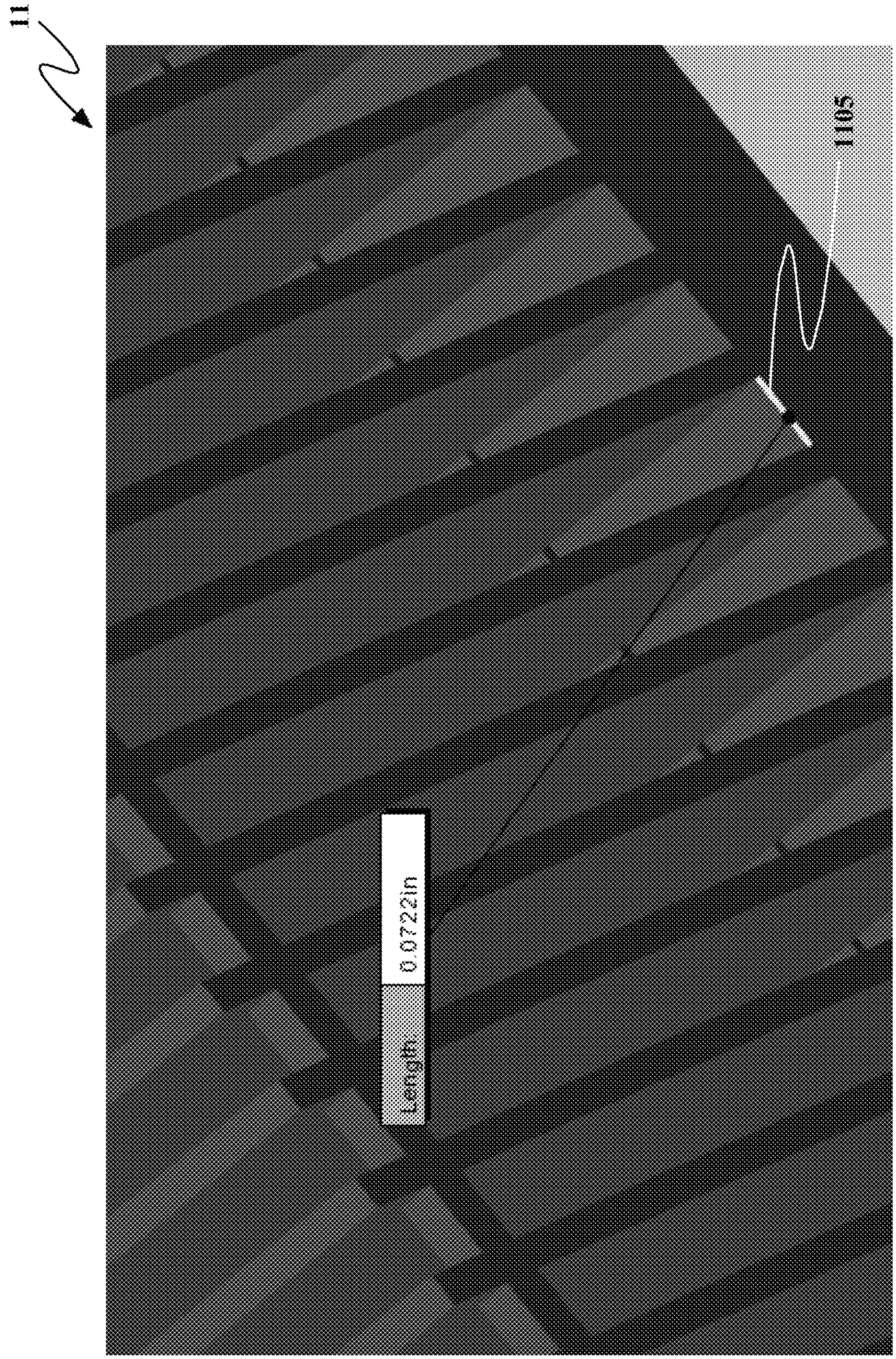
FIG. 11 is a perspective view of the heat sink assembly of FIG. 3.

Referring now to FIG. 6, in some embodiments, the heat sink assembly includes a high density zipper fin configuration 145 with adequate spacing between the fins to allow sufficient airflow from the variable speed air-cooling element (e.g., see FIG. 7 at 705) to adequately dissipate heat transferred from the lower proximal portion of the fins 320, the heat-dissipating pipes 310, or both to the upper distal portion of the fins 315. In some embodiments, the spacing between fins is between 0.05 inches and 0.1 inches (e.g., see FIG. 11 at 1105). In certain instances, the spacing between fins is approximately 0.07 inches 1105.

The heat sink assembly can further include a base plate 150, such as an aluminum base plate. In some embodiments, the back surface of the LED PCB (e.g., see FIG. 5 at 505) abuts the bottom surface of the base plate 150, the LED PCB 505 is mounted to the base plate 150 with a plurality of LED PCB screws 605. In some instance, the optical element 205 is positionally mounted such that the focusing qualities of the optical element 205 are aligned with the light-emitting diodes 515.

Figure 7:
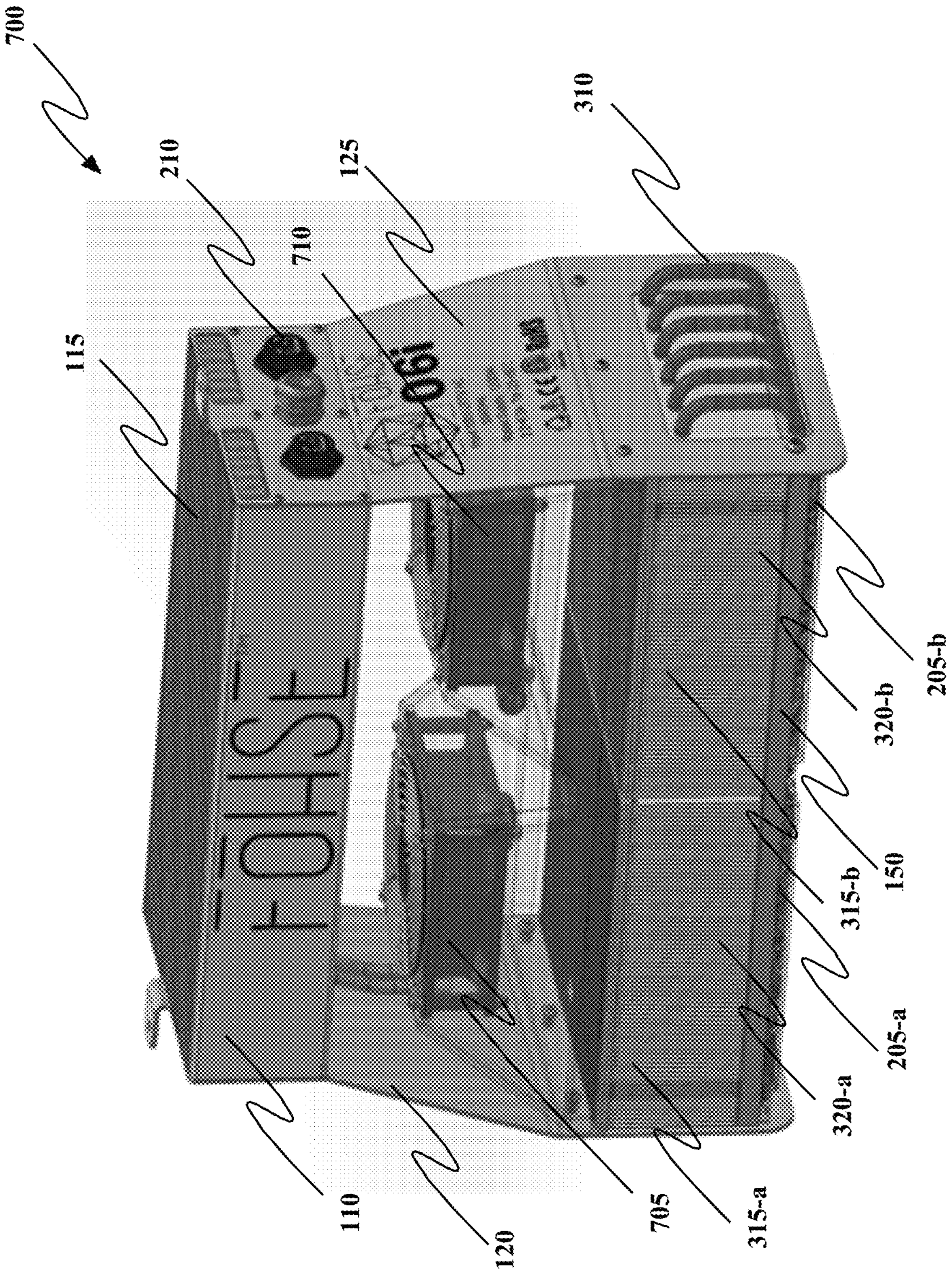
FIG. 7 is a front perspective view of the LED luminaire assembly of FIG. 1 and FIG. 2 showing the cooling fans.

Referring to FIG. 7, in some embodiments, the LED luminaire thermal management system includes at least one variable-speed air cooling element, such as a cooling fan 705, 710. The fan can be positioned above the upper distal portion of the heat sink fins at a distance conducive to providing adequate airflow to dissipate the heat transferred to the upper distal portion of the heat sink fins 315. In some instances, the variable-speed air cooling element 705, 710, are mounted to the inner top surface of the fan shroud (e.g., see FIG. 1 at 130, 135) with fan mounting screws 165. The fan shroud 130, 135 can be tightly or loosely sealed to increase the degree of airflow into the heat sink fins from the outtake portion of the variable-speed air cooling element 705, 710.

Figure 8:
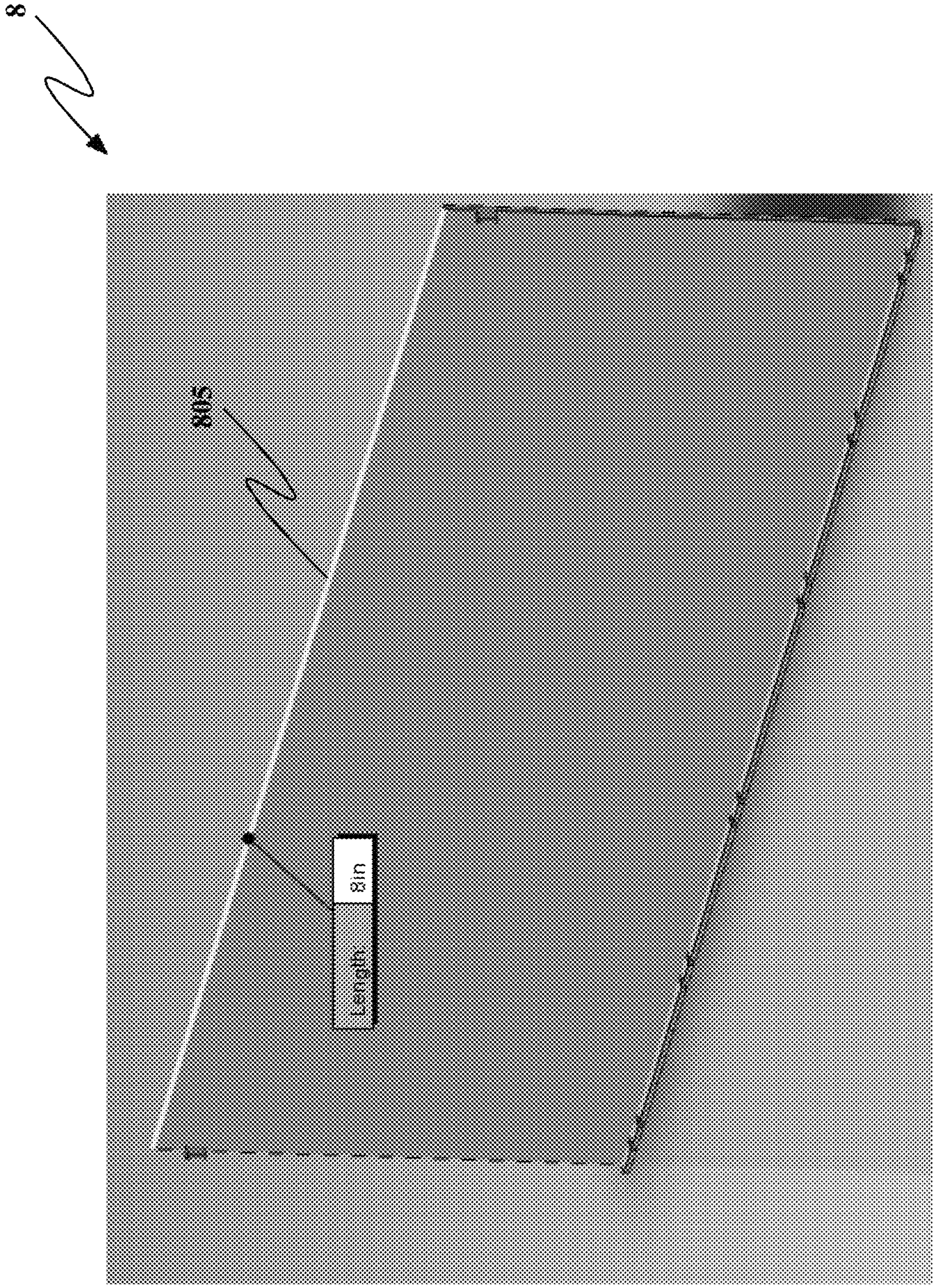
FIG. 8 is a perspective view of a fin of the heat sink assembly of FIG. 3.
Figure 9:
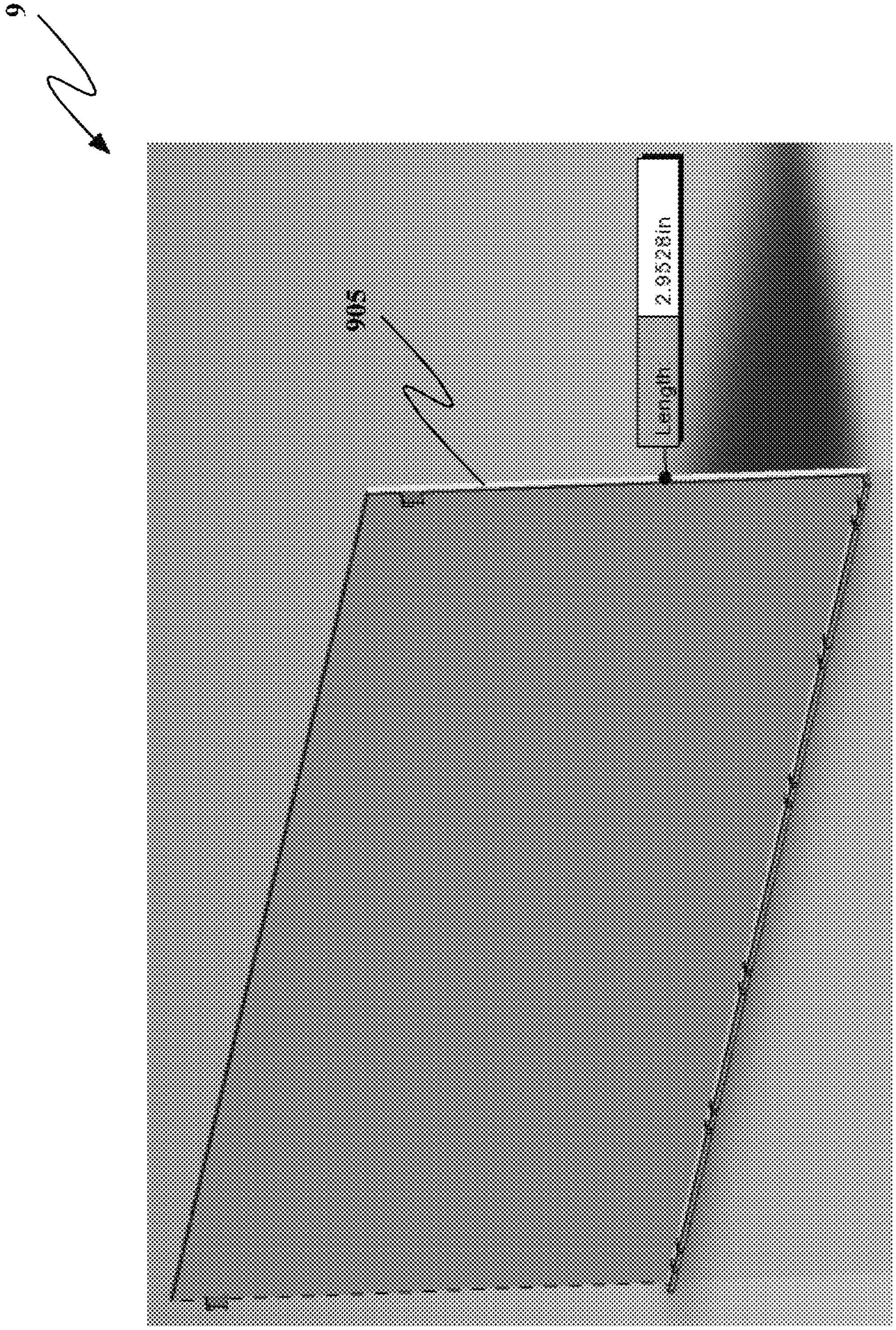
FIG. 9 is another perspective view of a fin of the heat sink assembly of FIG. 3.
Figure 10:
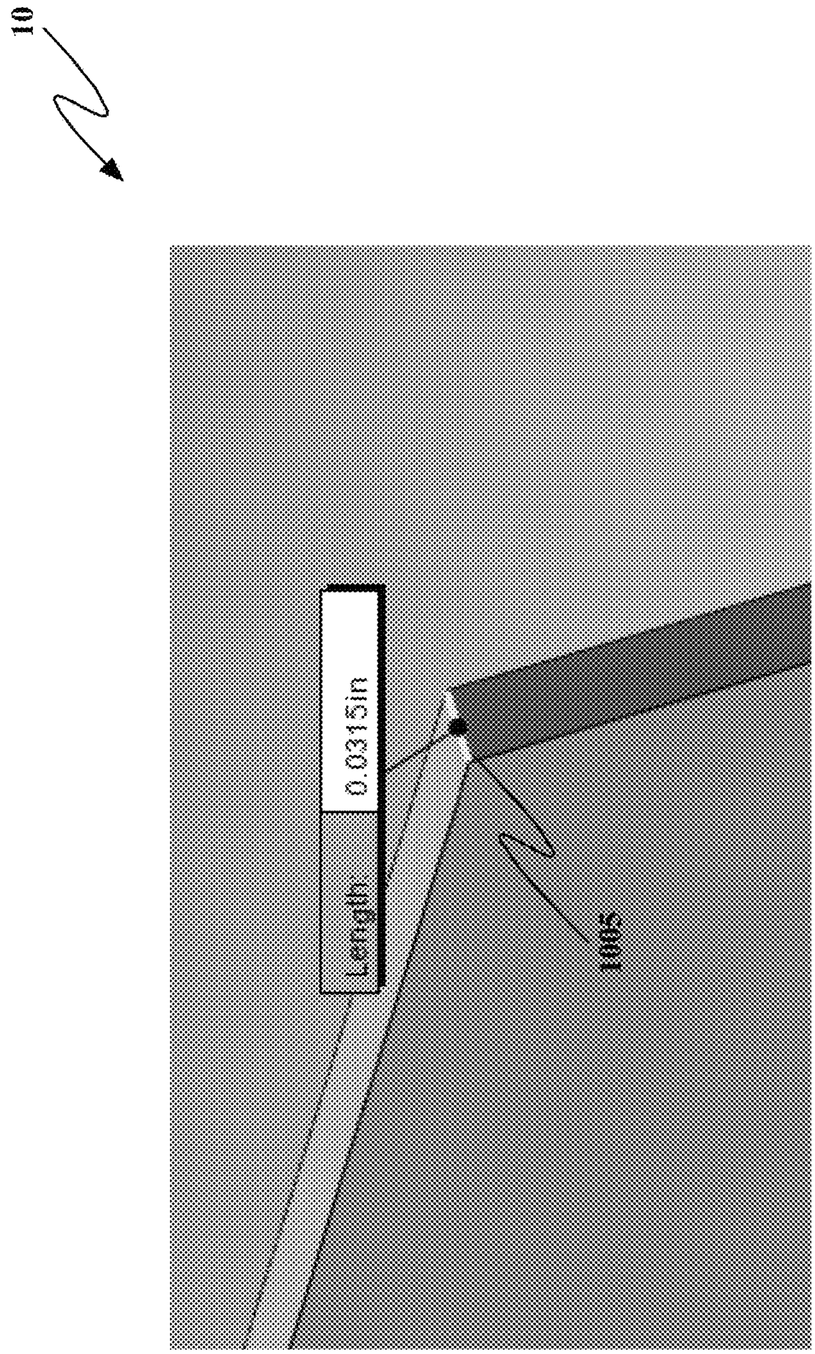
FIG. 10 is another perspective view of a fin of the heat sink assembly of FIG. 3.

Referring now to FIG. 8 through FIG. 10, in some embodiments the heat sink fins can measure between 6 inches and 10 inches along the top and bottom length of the fin 805, between 2 inches and 4 inches along the height of the fin side edges 905, and between 0.025 and 0.04 inches across the width of the fin 1005. In some instances, the heat sink fins measure approximately 8 inches along the top and bottom length of the fin 805, 2.9 inches along the height of the fin side edges 905, and 0.03 inches across the width of the fin 1005.

In some embodiments, the LED luminaire provides a thermal management system the includes a controller, such as a programmable driver with thermal response logic operable to receive indicia of an operational issue related to thermal management, such as an air-cooling element malfunction, and to provide for one or more operational responses to mitigate or correct the condition, resulting consequences, or both. In some implementations, the programmable driver includes thermal sensing response logic, light-emitting dimming control logic, air-cooling element control logic, and air-cooling element malfunction detection logic.

In some instances, the LED luminaire includes multiple variable speed air-cooling elements, such as multiple cooling fans, electrically coupled to the programmable driver. The LED luminaire further includes multiple light-emitting diodes electrically coupled to the programmable driver.

Upon detection by the air-cooling element malfunction detection logic of the programmable driver of a malfunction related to one of the air-cooling elements, such as by receiving error indicia from the environment, the air-cooling element, or both, the programmable driver can increase the power provided to one or more other air-cooling elements, and therefore the operational speed, in an attempt to compensate for the increase in heat resulting from the failure of the first air-cooling element.

In the event that this fails to obtain an operating temperature within an acceptable range, the light-emitting dimming control logic of the programmable driver can initiate a reduction to the power output level to one or more of the light-emitting diodes. In some implementations, in the event this additional response fails to adequately maintain or reduce the temperature such that it exceeds a critical threshold, the power level can be further reduced, or the LED luminaire can be fully powered down. In some instances where a set of light-emitting diodes are associated with a particular air-cooling element, those light-emitting elements can be powered down first by the light-emitting dimming control logic, while those light-emitting diodes primarily cooled by other air-cooling elements can remain fully or partially operational.

While the foregoing disclosure sets forth various embodiments using specific block diagrams, each diagram component, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures may be implemented to achieve the same functionality.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification are to be construed as meaning "at least one of." In addition, for ease of use, the words "including" and "having," as used in the specification, are interchangeable with and have the same meaning as the word "comprising." In addition, the term "based on" as used in the specification is to be construed as meaning "based at least upon."

What is claimed is:

1. A thermal management system for an LED luminaires, comprising:

a programmable driver comprising a thermal-sensing response logic, a light-emitting dimming control logic, an air-cooling element speed control logic, and an air-cooling element malfunction detection logic;

a temperature measuring element electrically coupled to the programmable driver; and a variable-speed air-cooling element electrically coupled to the programmable driver, the variable-speed air-cooling element comprising an air intake portion located proximal to the programmable driver.

2. The thermal management system of claim 1, wherein the temperature measuring element comprises a thermistor thermally coupled to a printed circuit board of the LED luminaire.

3. The thermal management system of claim 1, wherein the variable-speed air-cooling element comprises an air-directing structure configured to direct airflow from the air intake portion across a housing portion of the programmable driver.

4. The thermal management system of claim 1, wherein the light-emitting dimming control logic of the programmable driver is configured to reduce a power output level to one or more light-emitting diodes of the LED luminaire upon detection of an air-cooling element malfunction by the air-cooling element malfunction detection logic.

5. The thermal management system of claim 4, further comprising a second variable-speed air-cooling element electrically coupled to the programmable driver, wherein the variable-speed air-cooling element comprises a first variable-speed air-cooling element, and wherein upon detection of a malfunction of the first variable-speed air-cooling element by the air-cooling element malfunction detection logic, the air-cooling element speed control logic is configured to increase a speed of the second variable-speed air-cooling element and the light-emitting dimming control logic is configured to reduce a power output level to one or more light-emitting diodes of the LED luminaire.

6. The thermal management system of claim 1, further comprising an optical element positioned adjacent to a light-emitting diode of the LED luminaire.

7. The thermal management system of claim 6, wherein the optical element comprises a PMMA focal lens.

* * * * *